(12) United States Patent
West

(10) Patent No.: US 9,456,476 B2
(45) Date of Patent: Sep. 27, 2016

(54) PORTABLE LIGHTING DEVICE

(71) Applicant: Mag Instrument, Inc., Ontario, CA (US)

(72) Inventor: Stacey West, Temecula, CA (US)

(73) Assignee: MAG INSTRUMENT, INC., Ontario, CA (US)

( * ) Notice: Subject to any disclaimer, the term of this patent is extended or adjusted under 35 U.S.C. 154(b) by 125 days.

(21) Appl. No.: 14/541,847

(22) Filed: Nov. 14, 2014

(65) Prior Publication Data

US 2015/0156838 A1  Jun. 4, 2015

Related U.S. Application Data

(63) Continuation of application No. 14/184,190, filed on Feb. 19, 2014, now Pat. No. 8,890,426, which is a continuation of application No. 13/216,092, filed on Aug. 23, 2011, now Pat. No. 8,692,473.

(51) Int. Cl.
*H05B 37/02* (2006.01)
*H05B 33/08* (2006.01)
*F21L 4/00* (2006.01)
*F21Y 101/02* (2006.01)

(52) U.S. Cl.
CPC ............. *H05B 33/0815* (2013.01); *F21L 4/00* (2013.01); *H05B 33/0824* (2013.01); *H05B 33/0845* (2013.01); *H05B 37/0281* (2013.01); *F21Y 2101/02* (2013.01)

(58) Field of Classification Search
CPC ....................... H05B 33/0815; H05B 33/0818
USPC ......... 315/307, 308, 291, 209 R, 224, 200 A
See application file for complete search history.

(56) References Cited

U.S. PATENT DOCUMENTS

| 8,344,636 B2* | 1/2013 | Cheng | 315/224 |
| 8,890,426 B2* | 11/2014 | West | 315/200 A |
| 2009/0079355 A1* | 3/2009 | Zhou | H05B 33/0818 315/246 |

\* cited by examiner

*Primary Examiner* — Don Le

(57) ABSTRACT

A method for controlling a portable lighting device. The device has a switched-mode power supply, a light source, a high frequency switch, a controller controlling the operation of the light source and a user interface for inputting commands to the controller. A DC power source has a negative pole that is connected by only one single electric contact with the lighting device tail. The method for controlling a portable lighting device includes connecting a DC power source, an inductor, a light source, a high frequency switch and a resistor in series, measuring a voltage across the resistor, and controlling the high frequency switch dependent on the voltage measured across the resistor.

6 Claims, 12 Drawing Sheets

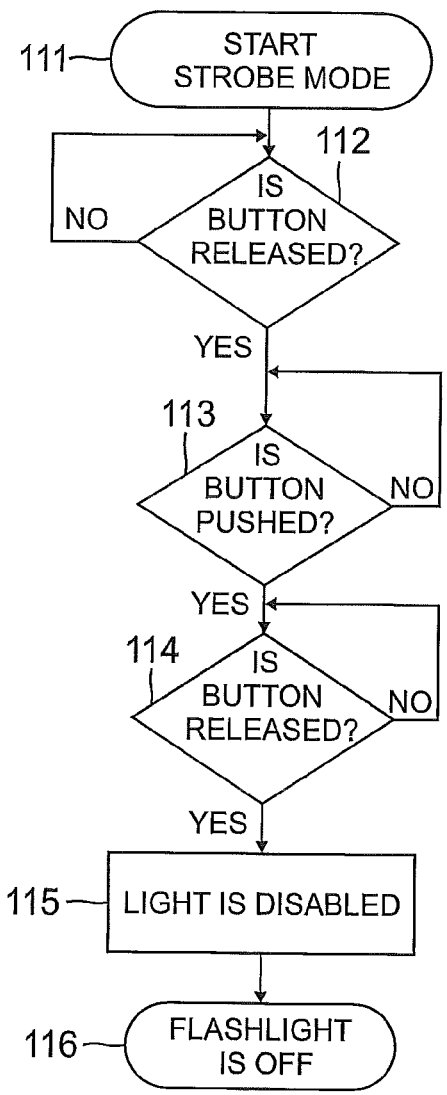
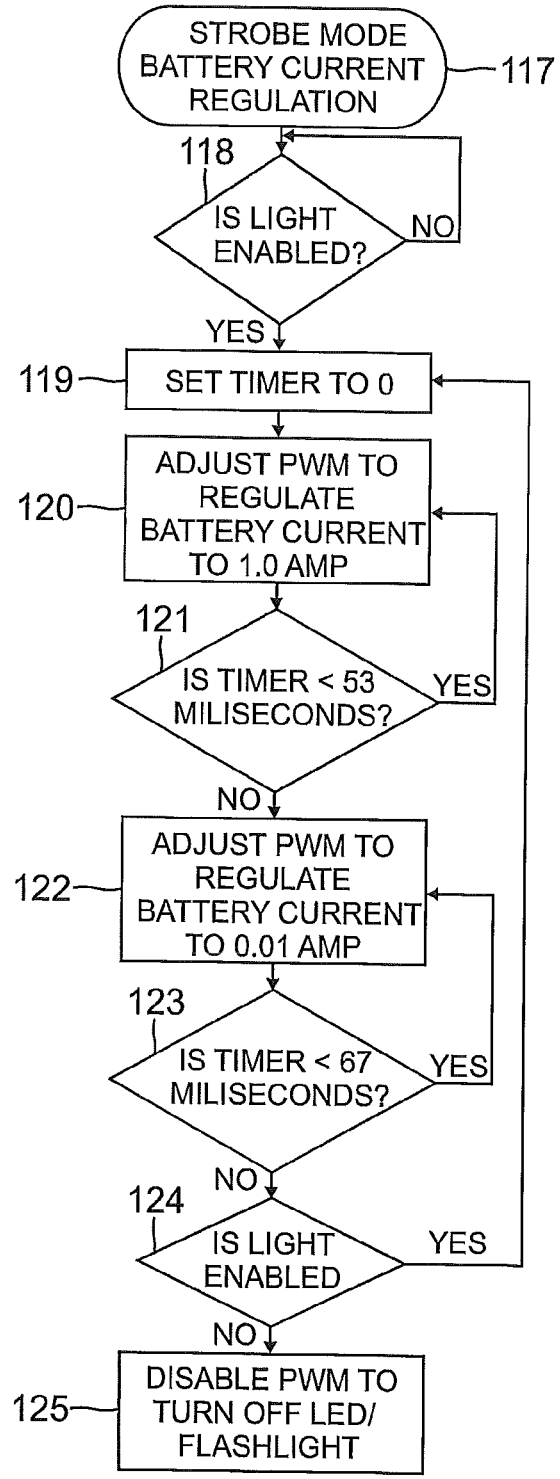
FIG. 10a
FIG. 10b

PORTABLE LIGHTING DEVICE

CROSS-REFERENCE TO RELATED APPLICATIONS

This application is a continuation application of U.S. Ser. No. 14/184,190, filed on Feb. 19, 2014, now issued as U.S. Pat. No. 8,692,473, which itself was a continuation application of U.S. Ser. No. 13/216,092, filed on Aug. 23, 2011, now issued as U.S. Pat. No. 8,692,473, the disclosures of which are hereby specifically incorporated herein by reference in their entireties.

TECHNICAL FIELD OF THE INVENTION

The current inventions generally relate to the field of portable lighting devices, including, for example, flashlights, lanterns and headlamps, and their circuitry.

BACKGROUND OF THE INVENTION

Various hand held or portable lighting devices, including flashlights, are known in the art. Such lighting devices typically include one or more dry cell batteries or rechargeable batteries having positive and negative electrodes. The batteries are arranged electrically in series or parallel in a battery compartment or housing. The battery compartment contains the batteries and may also, in some instances, be used to hold the lighting device. An electrical circuit is established from a battery electrode or terminal through conductive means which are electrically coupled with a light source, such as a lamp bulb or a light emitting diode ("LED"). After passing through the light source, the electric circuit continues through conductive means that are electrically coupled to the light source, which in turn are in electrical contact with the other electrode or terminal of a battery. The circuit includes a switch to open or close the circuit. Actuation of the switch to close the electrical circuit enables current to pass through the lamp bulb, LED, or other light source and through the filament, in the case of an incandescent lamp bulb-thereby generating light.

It may be desirable to provide multiple modes of operation for different needs. For example, in addition to the normal "full power" or "standard power" mode, a momentary mode only keeping the flashlight on as long as a pushbutton is pushed by a user, and/or a blink mode providing a strobe light or a blinking in a certain sequence like an SOS mode can be implemented in a portable lighting device, such as a flashlight. In such a portable lighting device, the user selects the desired mode of operation by manipulation of a user interface, which can be a main switch. For example, when the portable lighting device is in the normal mode or the power save mode of operation, the portable lighting device may be transitioned to another mode of operation, such as an SOS mode, by manipulating the main switch to momentarily turn "off" and then turn back "on" the portable lighting device. In another lighting device, the main switch may be required to be depressed and held a certain period of time to cause the lighting device to index to the next operational mode. Another option might be multiple pressing of the main switch by a user within a certain time between pressing and releasing the main switch button. A portable lighting device that includes advanced functionality may also include an electronic power switch controlled by a microcontroller or microprocessor to provide the desired functionality.

Flashlights and other portable lighting devices have conventionally employed a mechanical power switch in the main power circuit of the flashlight to turn "on" and turn "off" the portable lighting device. When the user turns "on" the portable lighting device, the user typically presses down or otherwise manipulates the mechanical power switch to mechanically connect two contacts to close the switch and complete the power circuit, thereby allowing current to flow from the positive terminal of the batteries, through the light source and to the negative terminal of the batteries. When the user turns "off" the portable lighting device, the user again manipulates the mechanical switch to disconnect the two contacts of the switch and thereby open the switch and break the power circuit. The mechanical power circuit in such devices, therefore, acts as a conductor in completing the power circuit, and thus conducts current throughout the operation of the portable lighting device.

For example, in multi-mode electronic portable lighting devices, the various modes of operation may be selected by a user turning off the lighting device for less than a predetermined period of time, such as 1 to 2 seconds, and then turning the lighting device back on again. In response to this short turn off period, the lighting device indexes to the next mode.

A known design for flashlights is to divide the electrical circuit so that the circuit elements needed in the direct vicinity of the light source are provided in the head of the flashlight, while the parts of the circuit that belong to the control of the flashlight are accommodated in the tail of the flashlight, including the man-machine interface, for instance a pushbutton.

Typically, at least 2 circuits are necessary, namely the main power supply circuit providing electrical power to the light source and a control circuit that controls the electrical power supplied to the light source. For any light source, specifically if the light source is an LED, the current through the LED needs to be constant or at least somewhat constant to provide a relatively constant output of light. In addition, it may be desirable to adjust the current so that the electrical power consumed by the LED stays constant to the extent this is desired. For instance, it may sometimes be desirable to accept a minor drop in electrical power, indicating to the user that the battery is getting old rather than regulating the buck circuit such as to compensate in full for the drop in electrical energy and then have a flashlight shut down without any warning at some point in time.

Regulation is typically achieved by a well known buck converter that reduces the voltage from the DC power source to the voltage needed for operating the LED, for instance to reduce a battery voltage of 5 V to an LED operating voltage of 3.2V. Buck converters comprise a high frequency switch, for instance turning the battery power periodically on and off at a frequency of 600 kHz. The regulating performance is achieved by a pulse width modulation (PWM), meaning that the duty cycle of the high frequency switch is modulated by modulating the time during which the switch is closed in comparison to the time over which the switch is open over one opening-closing cycle of the switch. Opening and closing the switch is repeated periodically at a high frequency, for instance 600 kHz. During the time the high frequency switch is closed, an inductor is charged that is connected in series with the light source, and during the time the high frequency switch is closed the inductor discharges electrical energy through the light source.

For controlling the duty cycle, typically a control circuit including a DC to DC converter circuit and/or a microcontroller is provided and the current through the light source is measured and sent as an input signal into the microcontroller that controls directly the duty cycle of the high frequency switch. In a flashlight, this results in a variety of design problems, for instance:

1. The man-machine interface is located in the tail. Therefore, it is preferred to provide also the microcontroller in the tail. Otherwise, an electric circuit would be necessary for transmitting the commands from the user through a tail switch to wherever the microcontroller is provided within the flashlight.
2. The control circuit needs to be provided with power. When providing the control circuit in the tail of the flashlight, while the light source needs to be of course in the head of the flashlight, different electric circuits are needed, i.e. the battery power needs to be brought both to the head and to the tail. This requires relatively complex mechanical parts like spring probes, contacts, and a housing able to accommodate these parts. Also, it makes the flashlights less robust as the risk of failure generally rises the more parts and the more electrical contacts need to be functional.
3. Since the LED is in the head of the flashlight, it is not only difficult to measure the current through the LED in the head where relatively little space is provided, but it would also require still another circuit to send this signal back into the DC to DC converter and/or microcontroller in the tail of the flashlight.

The result in the prior art was to provide several spring probes that contact different contacts. Since only one spring probe can be aligned with the central axis of the portable lighting device, contact rings need to be provided that can be contacted by biasing the spring probes against these contact rings. For using standard batteries, one solution in the prior art was to provide a battery cassette and provide contact rings on the battery cassette, and to provide contact rings in the head and the tail of the flashlight that can be contacted by spring probes provided in the battery cassette. While this solution works reliably, it comes at the price of a more complex design and is not a preferred solution for heavy duty portable lighting devices such as in use by law enforcement and the military favoring simple designs.

SUMMARY OF THE INVENTION

One object of the present patent document is to provide an improved portable lighting device that addresses or at least ameliorates one or more of the foregoing problems or needs. To this end, a number of portable lighting devices and methods of operating same are described herein. In general, the portable lighting devices may be any type of portable lighting device, including, for example, flashlights, headlamps, lanterns, etc.

In one aspect, a lighting device is provided comprising a switched-mode power supply comprising a high frequency switch that is switched at a switching frequency; a lighting device head accommodating a light source; a lighting device tail accommodating at least a user interface for inputting commands to the controller; a controller regulating the current through the light source; an electric conductor connecting the light source in the lighting device head with the user interface in the lighting device tail; and a DC power source having a negative pole that is connected by only one single electric contact with the lighting device tail.

Another aspect of a potential method of operating a portable lighting device, such as a flashlight or headlamp, involves a method for controlling a portable lighting device, comprising: electrically connecting in series in the subsequent order a) a DC power source, b) an inductor, c) a light source, d) a high frequency switch and e) a resistor; measuring a voltage across the resistor; and controlling the high frequency switch dependent on the voltage measured across the resistor.

Further aspects, objects, and desirable features, and advantages of the invention will be better understood from the following description considered in connection with the accompanying drawings in which various embodiments of the disclosed invention are illustrated by way of example. It is to be expressly understood, however, that the drawings are for the purpose of illustration only and are not intended as a definition of the limits of the invention.

BRIEF DESCRIPTION OF THE DRAWINGS

FIG. 10a is a user interface flow chart demonstrating the exemplary embodiment of FIG. 7 starting at a strobe mode of the flashlight.

FIG. 10b is a control circuit flow chart demonstrating the exemplary embodiment of FIG. 7 starting at a strobe mode of the flashlight.

DETAILED DESCRIPTION OF THE DRAWINGS

Figure 1:
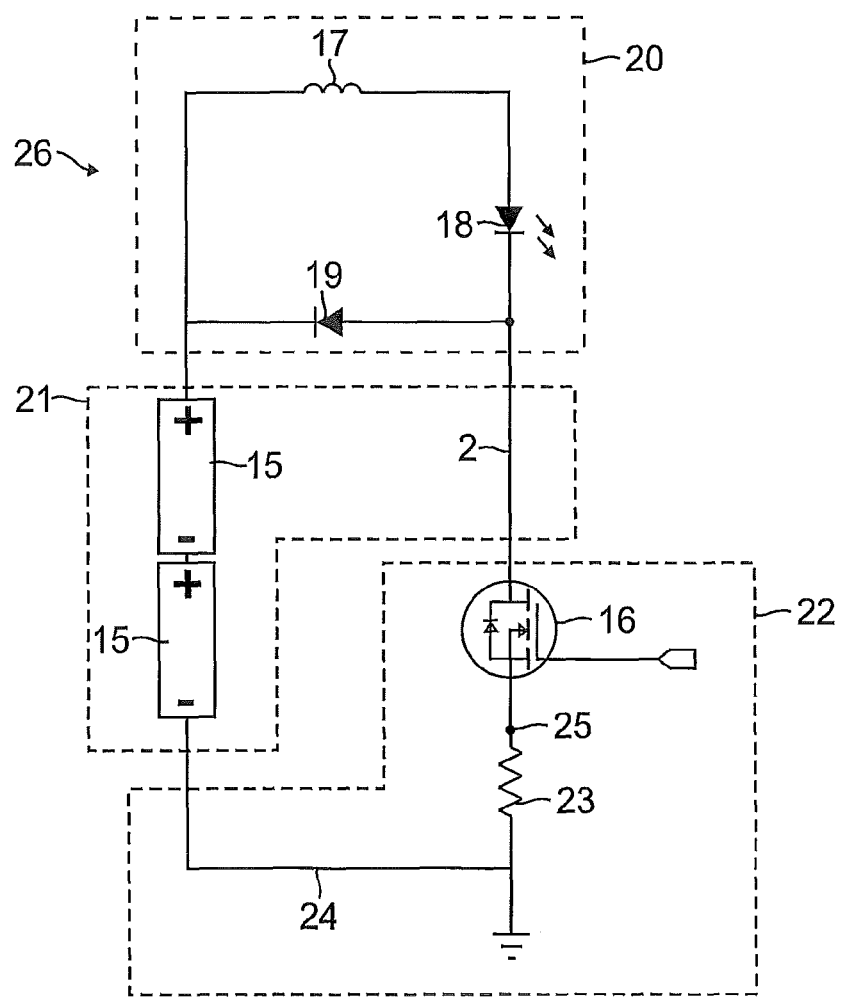
FIG. 1 is a circuit block diagram of the buck converter circuit according to the invention.

Embodiments will now be described with reference to the drawings. To facilitate the description, any reference numeral representing an element in one figure will represent the same element in any other figure. Further, in the following description, references to the front, forward, forward facing side or head end of a component shall generally mean the side of the component that faces toward the front end of the flashlight or other portable lighting device. Similarly, references to the aft, back, rear, rearward facing side or tail end of a component shall generally mean the side of the component facing the rear of the portable lighting device, e.g., the direction in which the tailcap is located in the case of a flashlight.

Figure 11:
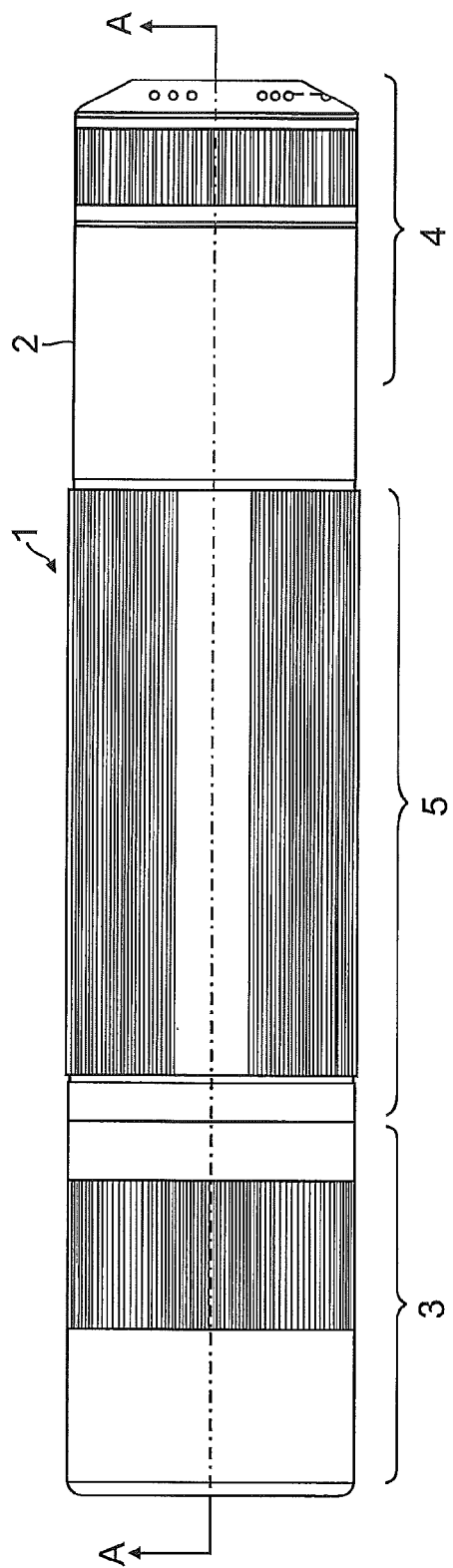
FIG. 11 is a plan view of an exemplary flashlight according to the prior art.

FIG. 11 shows an exemplary prior art portable lighting device, in the following called flashlight 1. Some distinct features and aspects in this prior art device are incorporated also in the portable lighting device of the present invention. While these distinct aspects have all been incorporated into flashlights in various combinations, the scope of the present invention is not restricted to flashlights. Rather, the present invention is directed to each of the inventive features of flashlights described below both individually as well as in various combinations. Further, as will become apparent to those skilled in the art after reviewing the present disclosure, one or more aspects of the present invention may also be incorporated into other portable lighting devices, including, for example, head lamps and lanterns.

The exemplary flashlight 1 according to FIG. 11 generally includes barrel 2, head assembly 3 located at the forward end of barrel 2, and switch and tailcap assembly 4 located at the rear end of barrel 2. The head assembly 3 is disposed about the forward end of the barrel 2, and the switch and tailcap assembly 4 encloses the aft end of barrel 2.

The barrel 2 may include a textured surface along a portion of its length for a user to grip. In the present embodiment, textured surface may be provided by broaching. Alternatively, textured surface may comprise a knurled or machine surface. Any desired pattern may be used for textured surface.

Figure 12:
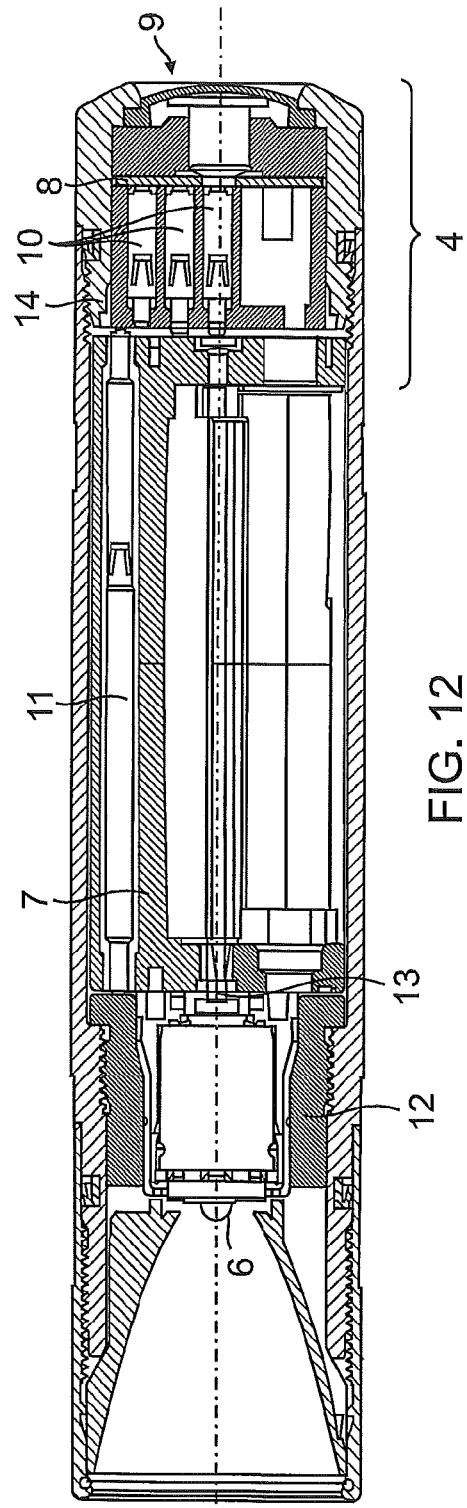
FIG. 12 is a cross-sectional view of the flashlight of FIG. 11 taken along the plane indicated by Line A-A.

FIG. 12 is a partial cross-sectional view of flashlight 1 of FIG. 1 taken along the plane indicated by line A-A. A light source 6 is mounted to the forward end of the barrel 2. A battery cassette 7 is accommodated within the barrel 2 and holds several batteries, for instance size AAA batteries. The switch and tailcap assembly 4 comprises a circuit board 8 holding a control circuit for controlling the power supply to the light source 6 and also for controlling various modes of operation for the flashlight if the specific flashlight is designed as a multi-mode flashlight. A man-machine interface MMI is provided in the form of a tailcap pushbutton 9 allowing an input by the user by pressing the pushbutton 9, for instance to allow providing an input signal into the control circuit on the circuit board 8.

For providing battery power on the one hand to the light source 6, on the other hand to the control circuit implemented on the circuit board 8 in the tailcap, a number of contacts and related spring probes 10 are provided. Three spring probes 10 are provided in the switch and tailcap assembly 4 and one spring probe 11 is provided in the battery cassette 7 for grounding a shoulder ring electrically connected to the light source so as to allow current to flow from a battery cassette contact 13 through the LED light source 6 through the spring probe 11 into the switch and tailcap assembly 4 where the control circuit and a high frequency switch are provided for controlling the power circuit powering the LED light source. It is to be understood that each spring probe contacts 2 electrical contacts, namely one on each end of the spring probe. Four spring probes means that also in total 8 electrical contacts need to be provided that may be subject to corrosion depending on the environment where the flashlight is used or whether the flashlight is used with care, for instance kept closed.

While this prior art flashlight has been successfully on the market for some time and proven to work reliably, it becomes apparent that it requires relatively complex component parts like the battery cassette 7 allowing to accommodate 3 batteries and the additional spring probe 11 to provide several contacts, a complex switch and tailcap assembly housing 14 that allows to accommodate 3 spring probes 10, and of course the in total 4 spring probes itself. It is noted that some of this complexity arises from the fact that the LED light source is provided in the head of the flashlight, while the control circuit including the man-machine interface is provided in the tail of the flashlight. An object of the invention is to keep these generally favorable locations of the LED light source and the control circuit, but simplify the complexity of the design and consequently make it more robust, particularly to reduce the number of contacts and spring probes. Before going into deeper detail with regard to the actual mechanical design of the flashlight according to the present invention, first the circuit according to the present invention is explained.

Light sources require typically a specific voltage and/or a specific current. Particularly when light emitting diodes (LEDs) are used as light sources, these require a regulated current source. However, portable DC power sources like batteries or rechargeable batteries as used in portable lighting devices such as flashlights are subject to a change in output voltage over time. These changes might occur due to partial discharging or other environmental influences like the temperature of the environment in which the flashlight is used. One energy efficient way of controlling the flashlight is the use of so-called buck converters. A DC power source is used providing more voltage than needed across the light source, and the control is performed by a high frequency switch that is controlled by a microcontroller to regulate the current through the light source. Specifically, the duty cycle is controlled, defined as the ratio between a pulse duration and the period of a rectangular waveform. In other words, the high frequency switch is periodically opened and closed, and the duty cycle is the ratio between the duration over which the switch is closed and the time period it takes to complete an entire cycle of opening and closing of the switch. A duty cycle of 100% means that the switch would be permanently closed, and a duty cycle of 0% means that the switch would be permanently open. The practical application, a duty cycle in between is chosen, for instance 60% meaning that the switch is closed 60% of the time while the switch is open 40% of the time. Keeping the switch closed over a longer time period means connecting the battery power for a longer time period to the circuit, i.e. allows more battery power to discharge into the circuit.

Figure 13:
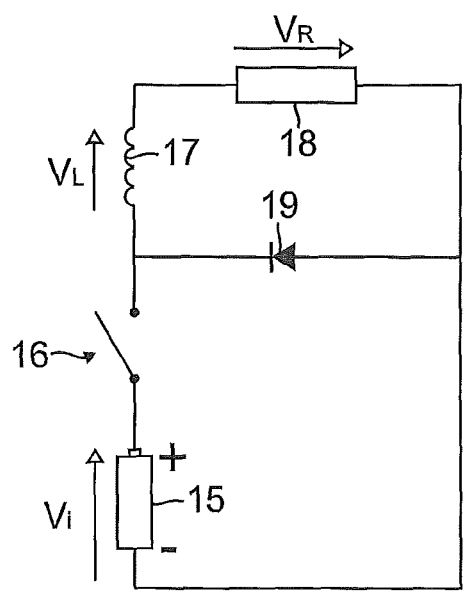
FIG. 13 is a circuit block diagram of a buck converter circuit according to the prior art.

FIG. 13 shows a typical prior art buck converter. A battery 15 supplies DC current at a voltage Vi. A high frequency switch 16 opens and closes at a frequency of for instance 600 kHz. When closed, electric current can flow through the outer circuit from the battery 16 through an inductor 17 into the LED 18 and from there back into the ground or into the negative pole of the battery 15. The inductor 17 resists over a certain time period this current flow by storing electric energy in the form of a magnetic field, meaning that some voltage drops across the inductor while the remaining voltage drops across the LED 18 so that some voltage across the inductor plus the voltage across the LED equals the battery voltage. When the switch 16 is opened, the outer circuit is interrupted, allowing the inductor 17 to discharge and maintain a current across the LED 18 via an inner circuit formed by the inductor 17, the LED 18 and the diode 19 which three elements 17, 18, 19 are now connected in series in this inner circuit.

Returning to the closed state of the switch 16, if theoretically the switch 16 would be kept closed for a long time and assuming an ideal inductor not having any resistance, the voltage across the LED would finally equal the battery voltage since the inductor will have finally created a stable magnetic field that is just determined by the final current that is the result of the battery voltage and the resistance of the LED and therefore will not store additional electric energy in form of a magnetic field. This explains why the average current through the LED can be controlled by controlling for how long the switch is closed during one opening and closing cycle, i.e. by controlling the duty cycle. Since the average current through the LED is what matters as a controlled variable, typically this current is measured as a feedback signal and provided as an input signal into the microcontroller that controls the duty cycle.

For a flashlight, this creates 3 challenges:

1. The LED is located in the head of the flashlight and the current through the LED is difficult to measure in this location.
2. Since the microcontroller is provided in the tail of the flashlight, it is difficult to transmit the measured current through the LED as a signal to the tail and would require an extra signal line.
3. As this typical buck converter topography shows, the switch is typically provided between the battery and the inductor that is connected in series with the LED. In a flashlight, however, the battery is provided in the barrel between the switch in the tail and the LED in the head, so that the typical buck converter circuit as shown in FIG. 13 is difficult to apply to a flashlight.

FIG. 1 shows the buck circuit topography according to the present invention. In interrupted lines, it has been indicated which particular parts of this circuit are located at which particular specific location within the flashlight. The three major groups of the circuit are the head circuit section 20, the barrel circuit section 21, and the tail circuit section 22.

Using the same reference numerals as in FIG. 13, the head circuit section 20 comprises the inductor 17 connected in series with the LED 18 and the diode 19 connected in series with the LED 18. In FIG. 13, this circuit having the inductor 17, LED 18 and the diode 19 connected in series was also called the inner circuit. Current through this inner circuit flows only when the high frequency switch 16 assumes its open position.

The barrel circuit section 21 comprises the batteries, for instance two 3 V batteries connected in series, and comprises the barrel 2 itself having besides the function of mechanically holding the batteries 15 also the function of a conductor that connects the light emitting diode 18 with the high frequency switch 16. The barrel circuit section 21 can also be described as the circuit section that connects the head circuit section 20 with the tail circuit section 22.

The tail circuit section 22 comprises the high frequency switch 16 and a resistor 23. It also comprises a spring probe 24 that will be shown in its mechanical implementation in FIGS. 3 and 4. This spring probe 24 is in contact with the negative pole of the battery and is grounded. A node 25 is provided between the high frequency switch and the resistor 23 for measuring a voltage across the resistor. It is to be understood that the resistor provides only a minor resistance since its main purpose is just to allow calculating the battery power as the variable to be determined based on the measure voltage and the known resistance based on Ohm's law. Referring back to prior art FIG. 13 and its description, the battery current is the current flowing through the outer circuit when the high frequency switch is in its closed position.

It becomes apparent that this circuit design as shown in FIG. 1 deviates from the typical buck converter design shown in the prior art. Reasons are that there are some design necessities or strong design preferences where some component parts should be located within the flashlight, e.g. the LED in the head of the flashlight, the power source somewhere in the middle, and the control including the MMI in form of the pushbutton in the tail of the flashlight. This resulted not only in positioning the component parts at different locations within the flashlight, but actually in an inventive reversed order in which these parts are connected within the buck circuit topography.

Figure 2:
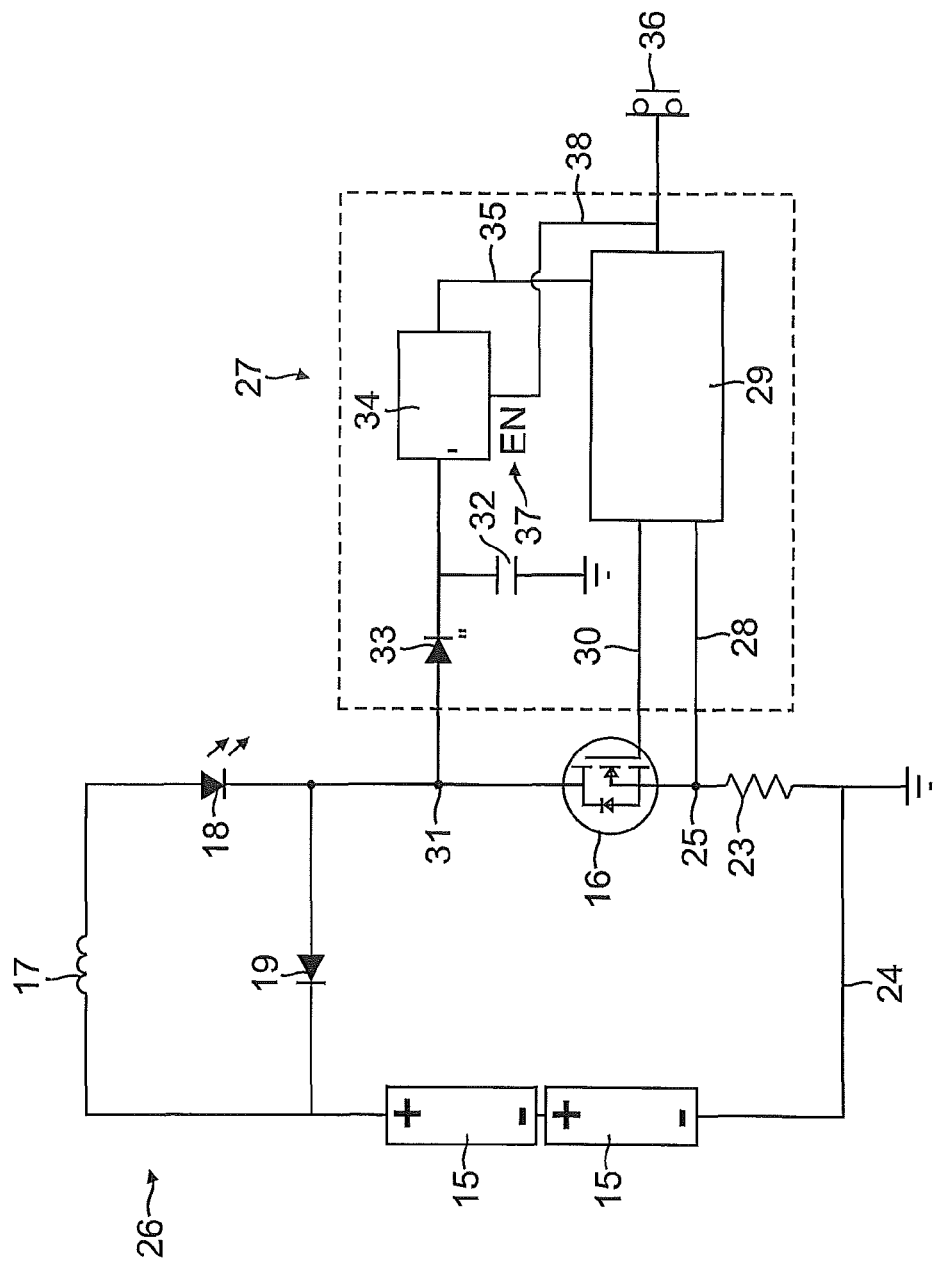
FIG. 2 is a circuit block diagram of the buck converter circuit according to the invention in connection with a control circuit according to the present invention.

Another inventive difference to prior art bucking circuits is that the controlled variable, i.e. the current through the LED, is not measured. As discussed above, measuring this voltage is difficult at the front of the flashlight and even if measured there as a feedback signal, such signal would somehow need to be conveyed into the tail of the flashlight where the control circuit is located. The invention therefore measures a different variable, namely the voltage at the resistor 23 at node 25. The resistor 23 is provided for that reason, and as can be seen by comparing the circuit according to the invention as shown in FIGS. 1 and 2 with the prior art circuit in FIG. 13, providing this resistor 23 in the bucking circuit also deviates from the prior art.

Notably, the controlled variable, namely the current through the LED 18, is not measured at all, but instead the battery current is calculated from the voltage across the resistor 23, and this battery current is fed into the microcontroller to adjust the duty cycle by pulse width modulation, and only indirectly by regulating the battery current by the duty cycle, the voltage across the diode is regulated.

When the high frequency switch 16 is closed, current rises through the system (including the LED 18) and energy is stored in the inductor 17. When the high frequency switch 16 opens, the energy in the inductor 17 is released through the LED and circulates back through the diode 19. The average LED current is the sum of the battery current when the high frequency switch 16 is closed and the recirculating current when the high frequency switch 16 is open divided by the period of the PWM signal. This means that the LED current is at least over major parts of the opening-closing cycle of the high frequency switch 16 higher than the battery current and is related to the duty cycle of the PWM. The voltage across the LED 18 floats to the necessary voltage for the current passing through the LED 18, and the remaining battery voltage is impressed across the inductor 17.

The LED current can be approximated by estimating the recirculating current and adding it to the battery current (measured at R1). The recirculating current changes with a dropping battery voltage over time. The unique regulating method and circuit according to the invention perform even without measurement of battery voltage by regulating the battery current and therefore by indirectly regulating the LED operation. Regulating the battery current sets the initial power delivered to the LED and as the battery voltage gradually drops over time, the power delivered to the LED drops. This method allows a simple control circuit to effectively operate a LED in a series configuration.

The table 1 below shows calculations of power delivered to a typical white LED (Cree XPG) using this method:

| VBAT | BATTERY CURRENT (REGU-LATED) | INPUT POWER | EFF | LED POWER | TYP VF | LED CURRENT |
|------|------|------|------|------|------|------|
| 5.50 | 1.00 | 5.50 | 0.80 | 4.40 | 3.20 | 1.38 |
| 5.00 | 1.00 | 5.00 | 0.80 | 4.00 | 3.20 | 1.25 |
| 4.50 | 1.00 | 4.50 | 0.80 | 3.60 | 3.20 | 1.13 |
| 4.00 | 1.00 | 4.00 | 0.80 | 3.20 | 3.20 | 1.00 |

In connection with FIG. 1 the buck converter circuit 26 has been described. In the following, the control circuit 27 is described by referring to FIG. 1, and how it interacts with the buck converter circuit 26. As already discussed in connection with FIG. 1, a voltage across the resistor 23 is measured at node 25. Through a signal line 28 the measured voltage is transmitted into the microcontroller 29 comprising an output signal line 30 that is directly connected with the high frequency switch 16. As discussed in connection with FIG. 2, the high-frequency switch 16 controls the duty cycle and this controls the battery current flowing through the outer circuit of the buck converter.

It is to be noted that the control circuit 27 is provided in the tail of the flashlight, while the positive pole of the battery 15 is closer to the front of the flashlight. According to the present invention, a unique method and circuit of powering the control circuit 27 has been developed according to the present invention, taking advantage of transient effects taking place over a short time when the switch 16 is opened. Opening the switch can also be imagined as making the resistance of the switch 16 infinite. Due to dynamic effects, the voltage close to the switch rises for a short time period at the node 31 that is located between the light emitting diode 18 and the high-frequency switch 16. This transient effect is used for capturing over a short period of time some electric energy in the form of electric current for charging a capacitor 32. A blocking diode 33 is connected in series in front of the capacitor 32 so that this current cannot discharge back into the buck converter circuit 26 via the node 31 after the transient effect has stopped and the voltage at the node 31 has dropped to a lower level than the voltage across the capacitor 32.

After this transient effect is over, the electric energy stored in the capacitor 32 discharges via a voltage regulator 34. For this voltage regulator 34, a regular linear voltage regulator is acceptable since the control circuit 27 requires only a very minimal current so that efficiency is not a major concern for the control circuit. The power consumption of the control circuit 27 is negligible in comparison to the power consumption of the buck converter circuit 26. A power line 35 leads from an output of the voltage regulator 34 into the microcontroller 29.

The unique properties of this design allow to eliminate a separate power supply circuit running from the batteries 15 into the control circuit. This has the consequence that another spring probe can be dispensed with since instead of a spring probe all that is necessary is to connect the diode 33 at its input side with the barrel of the flashlight. As illustrated in FIG. 2, the node 31 is in the section where the conductor of the buck converter circuit 26 is the barrel of the flashlight.

Another effect of this unique circuit for capturing electric energy from transient effects is a boosting effect. The voltage rises significantly over the voltage that is provided by the batteries 15. For example, at a battery power of 4.5 V, an output voltage from the capacitor 32 of about 15 V can be captured. Again, this is due to dynamic effects that occur over a short time when the resistance of the switch can be imagined to become infinite due to opening the switch. In addition, the boost effect is proportional to the duty cycle. As discussed in connection with FIG. 1, the duty cycle is increased when the battery voltage drops over time, for instance controlled to be 0.8 at a battery voltage of 4V and 0.58 at a battery voltage of 5.5 V. The following table 2 reflects this correlation:

| VBAT | Duty Cycle | OUTPUT - BUCK (TYP) | OUTPUT BOOST |
|------|------|------|------|
| 5.5 | 0.58 | 3.2 | 13.15 |
| 5   | 0.64 | 3.2 | 13.89 |
| 4.5 | 0.71 | 3.2 | 15.58 |
| 4   | 0.80 | 3.2 | 20 |

As can be seen from table 2, the voltage at the input of the control circuit actually rises when the battery voltage drops over time since a decreasing battery voltage means an increased duty cycle.

As a man-machine interface, a pushbutton 36 is provided. This pushbutton 36 is provided for turning the flashlight on and off and depending on the model also for selecting a specific flashlight operational mode, for example by repeatedly pressing the pushbutton 36 at a particular sequence in time, for instance several pushes within a specific time period. Structurally, the pushbutton 36 can be implemented by a snap dome. For avoiding any leakage of electric current through the control circuit, which may for instance result in a very minor though still visible powering of the LED 18, the voltage regulator 34 is provided with an enabling pin 37. The microcontroller feeds a signal through the signal line 38 to the enabling pin and keeps the voltage regulator turned on while the microcontroller is in a controlling mode. When the flashlight is turned off, the enabling pin disables the voltage regulator 34, blocking any power through the voltage regulator 34 and therefore preventing any leakage power that may leak otherwise through the control circuit 27 into the buck converter circuit 26.

In the following, the structural design of an exemplary flashlight is described by referring to FIGS. 3 and 4.

Figure 3:
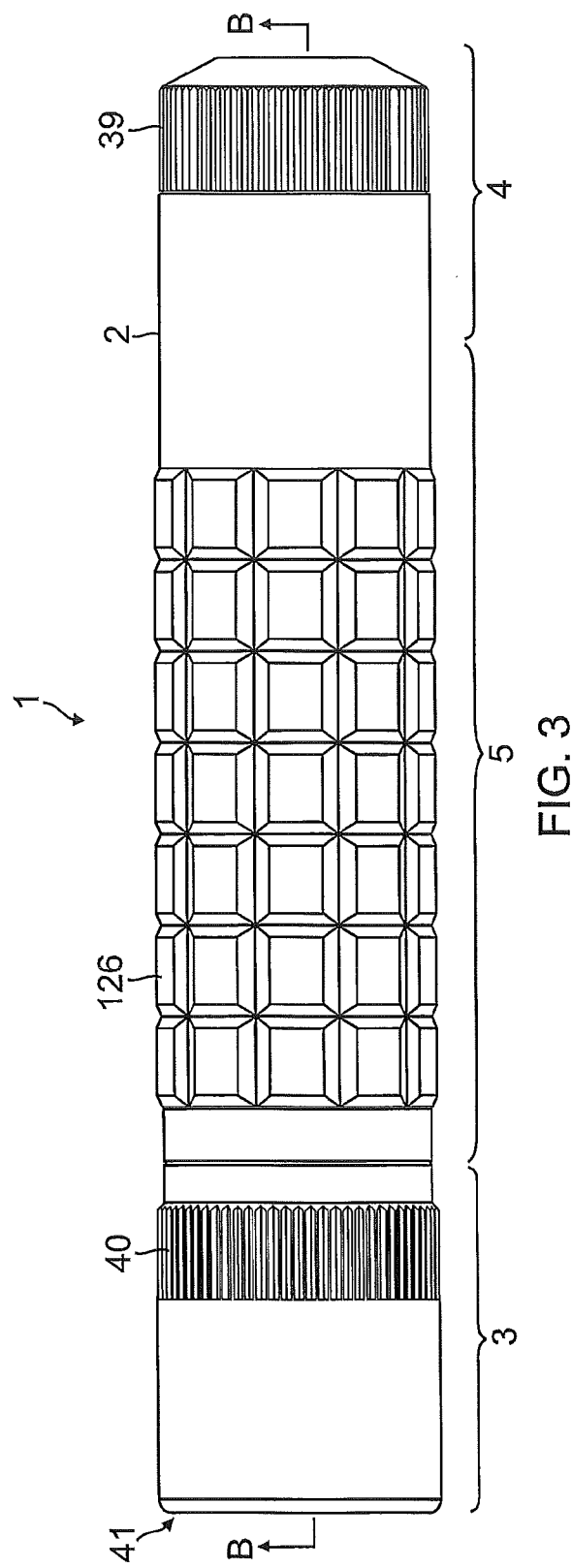
FIG. 3 is a plan view of an exemplary flashlight according to the invention.

FIG. 3 shows a similar side view compared to FIG. 11 demonstrating the prior art. This exemplary flashlight 1 according to the present invention generally includes barrel 2, head assembly 3 located at the forward end of barrel 2, and switch and tailcap assembly 4 located at the rear end of barrel 2. The head assembly 3 is disposed about the forward end of the barrel 2, and the switch and tailcap assembly 4 encloses the end of barrel 2.

The barrel 2 may include a textured surface 126 along a portion of its length for a user to grip. In the present embodiment, textured surface 126 may be provided by broaching. Alternatively, textured surface 126 may comprise a knurled or machined surface. Any desired pattern may be used for textured surface 126. In this particular design, for textured surface, also referred to as knurling, has been manufactured by machining. Textured surfaces 39 and 40 are provided at the switch and tailcap assembly 4 and the head assembly 3, respectively. In this preferred embodiment, the textured surface 39 on the switch and tailcap assembly 4 and the textured surface 39 at the head assembly 3 are identical. The head assembly 3 comprises a substantially plane front face 41 while also other shapes are used in other preferred embodiments, for instance a scalloped front face for breaking glass in case of an emergency.

Figure 4:
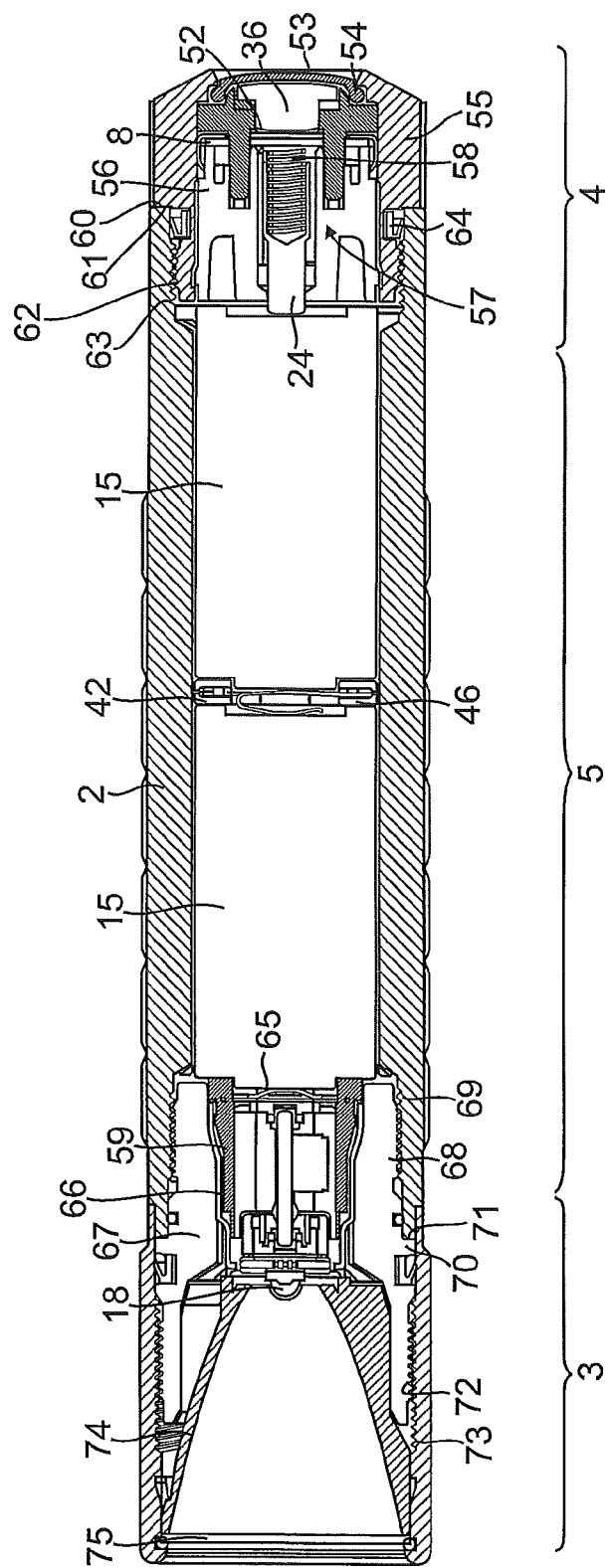
FIG. 4 is a cross-sectional view of the flashlight of FIG. 3 taken along the plane indicated by Line B-B.

FIG. 4 is a partial cross-sectional view of flashlight 1 of FIG. 3 taken along the plane indicated by line B-B. An LED light source 18 is mounted to the forward end of the barrel 2. Two 3 V batteries 15 are accommodated within the barrel 2 and connected to each other in series so that the total voltage output of the two batteries is 6 V when the batteries are still fresh. A spacer 42 is provided between the two batteries 15 having on the one hand the function to facilitate electrical contact between the positive pole of the battery located closer to the rear of the flashlight and the negative pole of the battery located closer to the front of the flashlight and on the other hand protect the batteries from damage caused by stronger impacts since the spacer 42 provides for a stronger mechanical support between the outer housing rims of the batteries 15 via the spacer 42 sandwiched therebetween. In addition to protecting the batteries 15 from damage due to impacts, the spacer 42 also prevents any interruption in the current flow that may otherwise result from impacts. It is specifically important to prevent such current flow interruptions in the design according to the present invention for keeping the control circuit 27 powered and avoid inadvertently turning off the flashlight. In this connection, it is referred back to the control circuit 27 shown in FIG. 2, demonstrating the enabling pin 37 of the voltage regulator 34, the enabling pin 37 receiving electric voltage through the signal line 38 for keeping the voltage regulator 34 on. As discussed in connection with FIG. 2, absent any voltage at the enabling pin 37, the voltage regulator 34 is turned off, specifically for avoiding any leakage of current through the control circuit 27 and therefore avoiding any current flowing through the LED 18. Even a relatively short interruption in receiving battery power may result in turning the voltage regulator 34 off in its entirety, and it could then only be restarted by pressing the pushbutton 36 again for turning the entire flashlight on and selecting the operational mode. Depending on the selected operational mode, this might require even multiple button pushes. The spacer 42 effectively avoids any interruption in the electric current.

Figure 5:
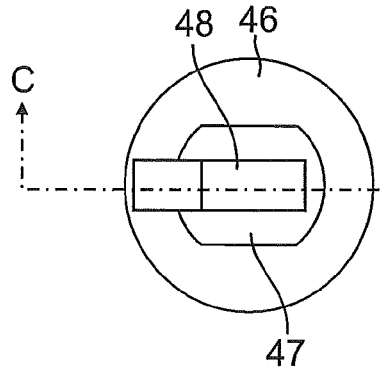
FIG. 5 is a plan view of a spacer placed between 2 batteries connected in series.
Figure 6:
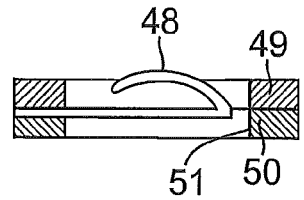
FIG. 6 is a cross-sectional view of the spacer of FIG. 5 taken along the plane indicated by Line C-C.
Figure 7:
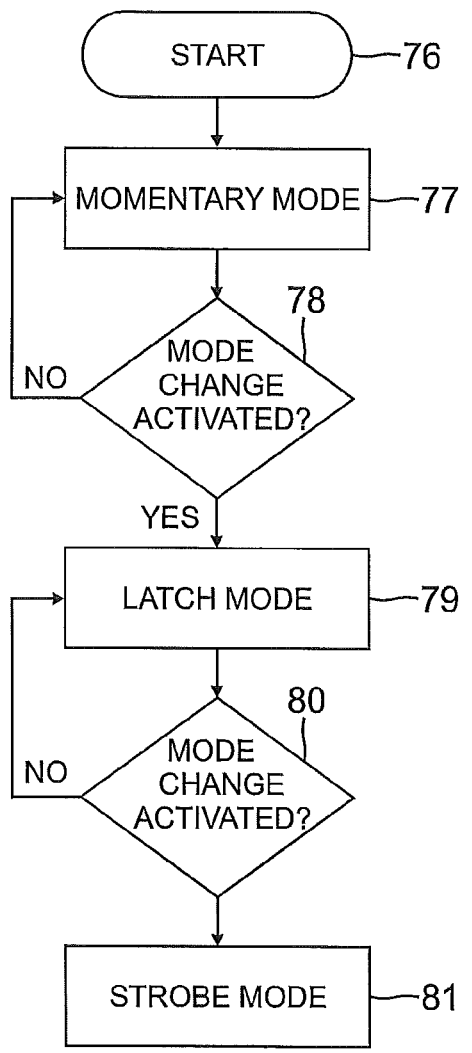
FIG. 7 is a user interface flow chart demonstrating an exemplary embodiment of various operational modes for a flashlight.

The design of this spacer 42 is shown in FIGS. 5 and 6. An outer rim 46 encompasses an open space 47 into which the electric contact 48 protrudes. The outer rim of 46 is preferably made from a dielectric such as electrically non-conductive plastics. The electric contact 48 is preferably made from metal having both good electrical conductive properties, as well as being able to provide sufficient spring force. According to a preferred embodiment, the electric contact 48 can be made from steel.

FIG. 6 shows a cross-sectional view taken along lines C-C in FIG. 5. The electric contact 48 is sandwiched between an upper rim part 49 and a lower rim part 50. The upper and lower rim parts 49 and 50 can be attached to each other by gluing. As it becomes apparent from FIG. 6, the electric contact 48 is kept in place by abutting against an inner cylindrical surface 51 if moved in a radial direction, and can therefore not be removed in this direction when sandwiched between the upper rim part 49 and lower rim part 50.

Returning now to the sectional view of the entire flashlight according to FIG. 4, the switch and tailcap assembly 4 comprises a circuit board 8 holding the control circuit 27 for controlling the power supply to the light source, in this exemplary embodiment designed as an LED 18, and also for controlling various modes of operation for the flashlight if the specific flashlight is designed as a multi-mode flashlight. The various operational modes of the flashlight will be explained further below by referring to FIGS. 7-10 showing flow diagrams demonstrating how these multiple operational modes can be established by multiple pushes on the pushbutton 36. The pushbutton 36 interacts with a snap dome 52 and creates an electrical contact between contacts provided on the circuit board 8. For protecting the pushbutton assembly and also for sealing the tail end of the flashlight, a switch port seal 53 is provided that interacts via its outer rim 54 with an outer tailcap housing 55 in a sealing fashion. The outer tailcap housing 55 encompasses an inner tailcap housing 56 that is preferably made from a dielectric, for instance made from plastic by injection molding. The tailcap housing 56 accommodates a spring probe 57 comprising a spring 58 and a pin 24. At its tail end, the spring probe 57 is in electric contact with the circuit board 8 and at its front end via the pin 24 with the negative pole of the batteries 15. The circuit board 8 is further in electric contact with the outer tailcap housing 55 that establishes via a ring-shaped circumferential contact surface 60 an electrical contact with a respective ring-shaped end face 61 of the barrel 2.

The switch and tailcap assembly 4 comprises at its front end an external thread 62 that is threaded into an internal thread 63 provided at the tail end of the barrel 2. A lip seal 64 seals the switch and tailcap assembly 4 with respect to the barrel 2. Although it would be possible to establish an electrical contact between the outer tailcap housing 55 and the barrel via the internal and external threads, respectively, from a manufacturing point of view it is preferred to establish the electric contact between the contact surface 60 and 61 so that the surface of the entire barrel 2 and the outer tailcap housing 55 can be covered by an appropriate surface coating or surface treatment such as applying paint, enameling or anodizing including the threads. The contact surfaces 60 and 61 can then easily be machined so that any coating is removed in this area where the electric contact should be established, creating well defined plain contact surfaces 60 and 61. In addition, since these contact surfaces 60 and 61 are pressed against each other by the force created from the threads 62 and 63, a good electric contact of low resistance can be established.

Briefly summarizing the switch and tailcap assembly 4 again, it comprises a very simple design requiring only two electric contacts, namely a first electric contact established by the spring probe 57 between the negative pole of the battery 15 and the circuit board 8, and a second electric contact established via the contact surfaces 60 and 61 via the outer tailcap housing 55 with the electric circuit board 8. The latter contact is connected via the LED 18 with the positive pole of the battery 15 that is located closer to the font of the barrel 2, as will be discussed in the following by describing the head assembly and the assembly provided within the front end of the barrel 2. The circuit board 8 comprises the control circuit 27 and the high frequency switch 16 as well as the resistor 23, all described in FIG. 2 and summarized as forming together with the pin 24 the tail circuit section 22 as indicated in FIG. 1. The batteries 15 and the barrel 2 jointly form the barrel circuit section 21 as likewise indicated in FIG. 1.

In the following, the structural implementation of the head circuit section 20 (see FIG. 1) is described. The LED 18 is held in a light source carrier 59, including also the necessary circuit parts for powering the LED 18, including the inductor 17 and the blocking diode 19 of the head circuit assembly 20 as demonstrated in FIGS. 1 and 2. An electric contact 65 contacts the positive pole of the battery 15. An electric conductor 66 establishes an electric contact from the light emitting diode 2 to a crown-shaped LED carrier 67 comprising at its rear end an external thread 68 that is screwed into an internal thread 69 provided in the front of the barrel 2. The LED carrier 67 comprises a flange 70 pressing against a front face 71 of the barrel 2 when the external threads are screwed into the internal threads 69 of the barrel 2, establishing an electric contact between the flange 70 and the ring-shaped front face 71 of the barrel 2. Like the ring-shaped end face 61 also the ring-shaped front face 71 can be machined to establish a plane and even contact surface that is free of any coating so that the good electric contact can be established when the LED carrier 67 is screwed firmly into the front of the barrel 2. The LED carrier 67 may be free of any coating in its entirety since it is just an internal flashlight part that can be manufactured by any standard manufacturing method such as stamping, extruding, turning and/or milling or any combinations thereof.

In addition, this LED carrier 67 also provides an external thread 72 onto which the internal thread 73 of the head assembly 3 can be screwed. The head assembly 3 can be designed to be free of any circuit parts, and provide just optical functions such as to focus, collimate or disperse the light from the LED 18 via a parabolic reflector 74 and to send the light out through a lens 75 sealing the head assembly 3. The relative position between the reflector 74 and the LED 18 can further be changed by screwing the head assembly away from or towards the LED 18, changing the focal point.

In the following, the structural implementation of the electric circuit according to the present invention as demonstrated in FIGS. 1 and 2 is described. The two batteries 15 are connected in series via the spacer 42 described in FIGS. 5 and 6 and are connected to the head circuit section 20 via the contact 65, allowing electric current to flow through the LED 18. From the outlet of the LED 18, electric current flows into the LED carrier 67 and via the flange 70 and contact surface 71 into the barrel 2. From the barrel 2, electric current flows via the contact surfaces 60 and 61 and the outer tailcap housing 55 into the circuit board 8 and from the circuit board 8 via the spring probe 57 comprising the spring 58 and the pin 24 into the negative pole of the battery 15, closing the electric circuit. The control circuit 27 as well as the high frequency switch 16 and the resistor 23 are implemented on the circuit board 8.

A variation of this embodiment can be created by providing both the buck circuit 26 and the control circuit 27 in the front of the flashlight and provide another very simple control circuit in the tail of the flashlight that controls just the on/off functions as described above. This would still allow a structurally simple design comprising only one single spring probe, namely the spring probe in the tail of the flashlight contacting the negative pole of the battery 15. In this alternative design, the LED could be in the head of the flashlight with a current regulating circuit located also in the head. The tailcap would still have a microcontroller, but would be provided only for shutting the flashlight on and off and selecting the operational mode of the flashlight, i.e. just perform the functions of the user interface, but not the function of regulating the current. The tailcap would no longer have any control over the LED current (either directly or indirectly), but would be an electronic switch that controls on/off. While this alternative design would still have only one single spring probe, it would have an extra control circuit controlling on/off and mode selection. It is therefore preferred to have only one control circuit in the tail of the flashlight that is also accessed by the user interface, in this case the pushbutton.

While a variety of different designs for user interfaces are possible, for instance comprising one or more pushbuttons, a GPS device sensing the motion of the entire flashlight, both translatory and/or rotational movement, or a sensor measuring acceleration, in the following one preferred example of a user interface is described by referring to FIGS. 7 to 10. This exemplary user interface is designed to be as simple as possible, allowing three operational modes, namely 1. a momentary mode, 2. a latch mode; and 3. a strobe mode. All of these modes are selected by the user simply by pushing the pushbutton 36 (see FIG. 4) one or more times. The operation starts at 76 with the flashlight turned off. One push of the pushbutton 36 results in selecting the momentary mode at 77. This operational mode can be changed, for instance, by pressing the pushbutton 36 a second time within a short time period, resulting in establishing the latch mode at 79. By an additional input at 80, for instance, by pushing the pushbutton again after a short time period, finally at 81 a strobe mode can be established. It is to be understood that an unlimited number of additional modes can be established, for instance by pressing the pushbutton 36 at a short sequence in time for one or more times.

Figure 8A:
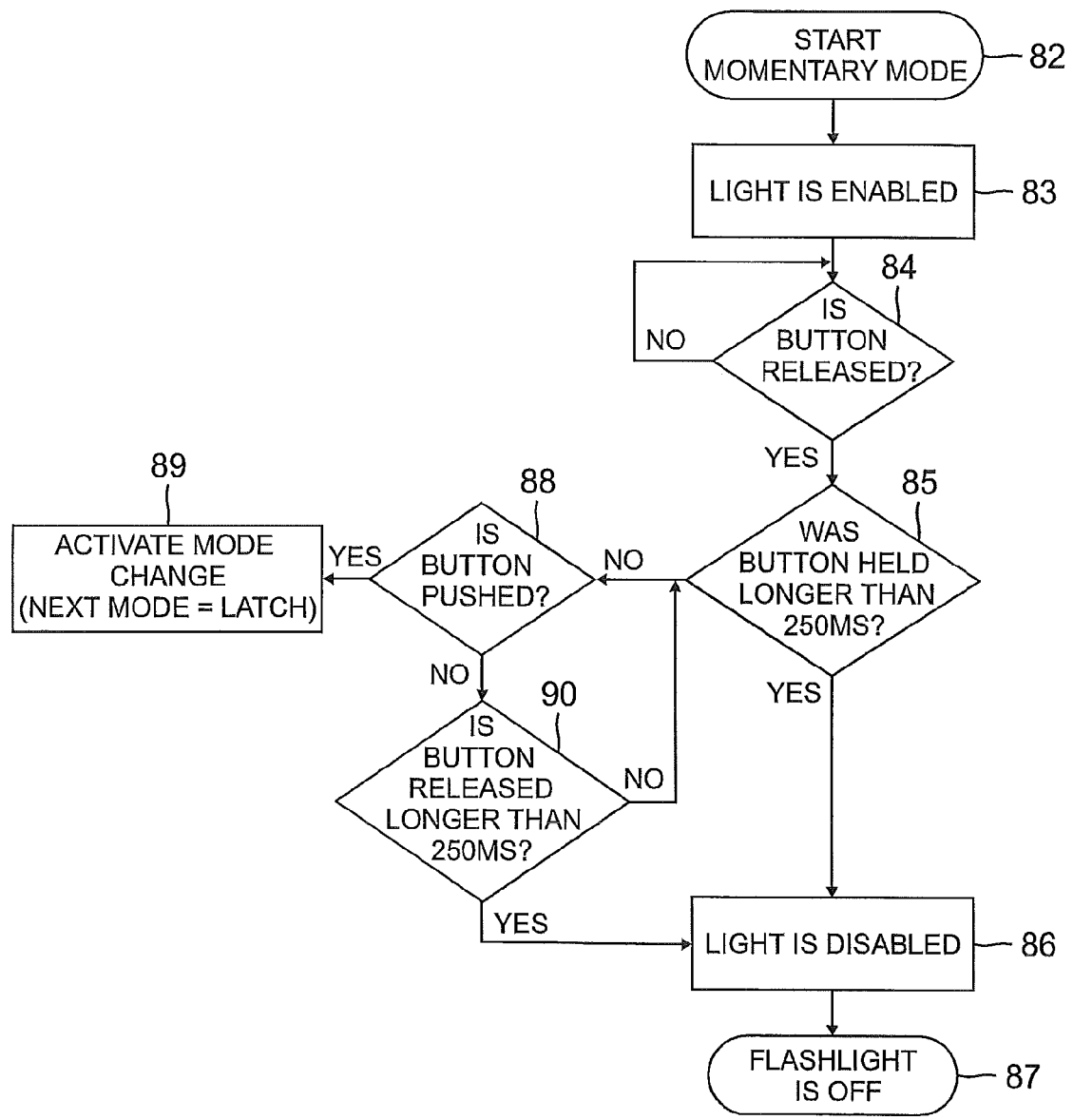
FIG. 8a is a user interface flow chart demonstrating the exemplary embodiment of FIG. 7 starting at a momentary mode of the flashlight.

FIG. 8*a* goes into more detail as to how the momentary mode is established. If the user chose at 82 to establish the momentary mode the light is enabled at 83. Referring briefly back to FIG. 2, enabling the light means that the microcontroller 29 keeps sending a signal through the signal line 38 to the enabling pin 37 of the voltage controller 34. At 84, it is determined whether the button has meanwhile been released. If not, the light is kept in the enabled state. If the pushbutton had meanwhile been released, it is determined at 85 whether the pushbutton was pressed for more than 250 ms. If that is the case, the light is disabled at 86 and the flashlight is turned off at 87. If the pushbutton was not pressed for more than 250 ms, it is determined at 88 whether the pushbutton is pushed again, and if so, a mode change is activated at 89, in this case moving to the next operational mode in the sequence of operational modes which is the latch mode in which the flashlight is kept turned on permanently. If in contrast the pushbutton was not pushed again after a short time period, i.e. had been released for longer than 250 ms, this is determined at 90 and the control loop moves on to disable the light at 86 and then again turn off the flashlight entirely at 87. This latter routine means that the flashlight was still operated in the momentary mode, but only for a very short time period of up to 250 ms, but no mode change was activated since the pushbutton was not pressed for a second time.

Figure 8B:
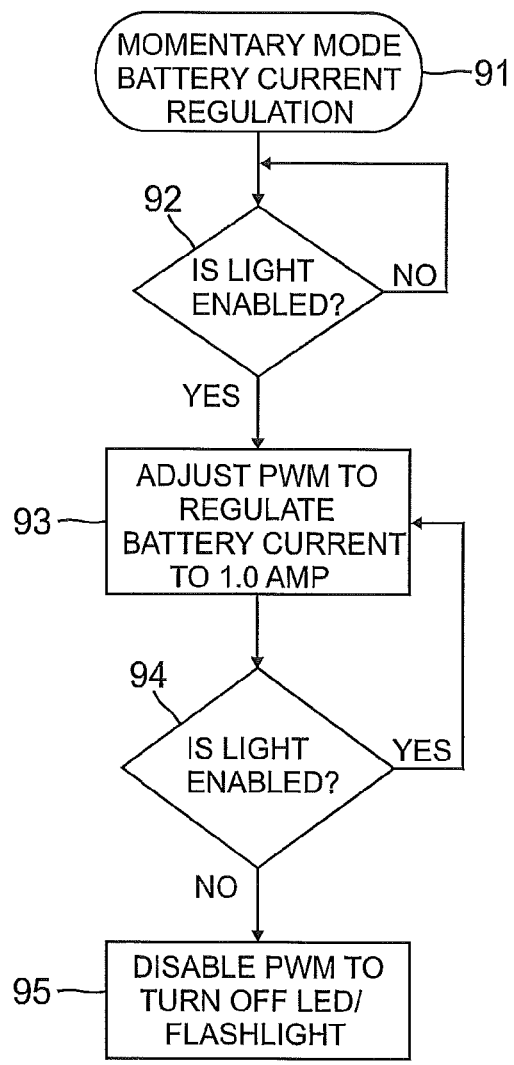
FIG. 8b is a control circuit flow chart demonstrating the exemplary embodiment of FIG. 7 starting at a momentary mode of the flashlight.

While FIG. 8*a* demonstrates the actions of the user for selecting operational modes and how the actions by the user are perceived by the control, FIG. 8*b* demonstrates the current regulation starting from the momentary mode. At 91, the current regulation for the momentary mode is started. When the light is enabled as determined at 92, the pulse width modulation is regulated at 93 to set the current to 1 Amp. Again, modulating the pulse width means adjusting the duty cycle as this has been explained in detail in connection with FIGS. 1 and 2. If it is determined at 94 that the light is still enabled, which does of course depend on the actions by the user, the control loop keeps controlling the battery current to remain at 1 Amp. If in contrast it is determined at 94 that the light is disabled or in other words not enabled, the pulse width modulation is disabled and the LED and respectively the entire flashlight is turned off at 95, again meaning as described in connection with FIG. 2 to disable the voltage regulator 34 via disabling the enabling pin 37.

Figure 9A:
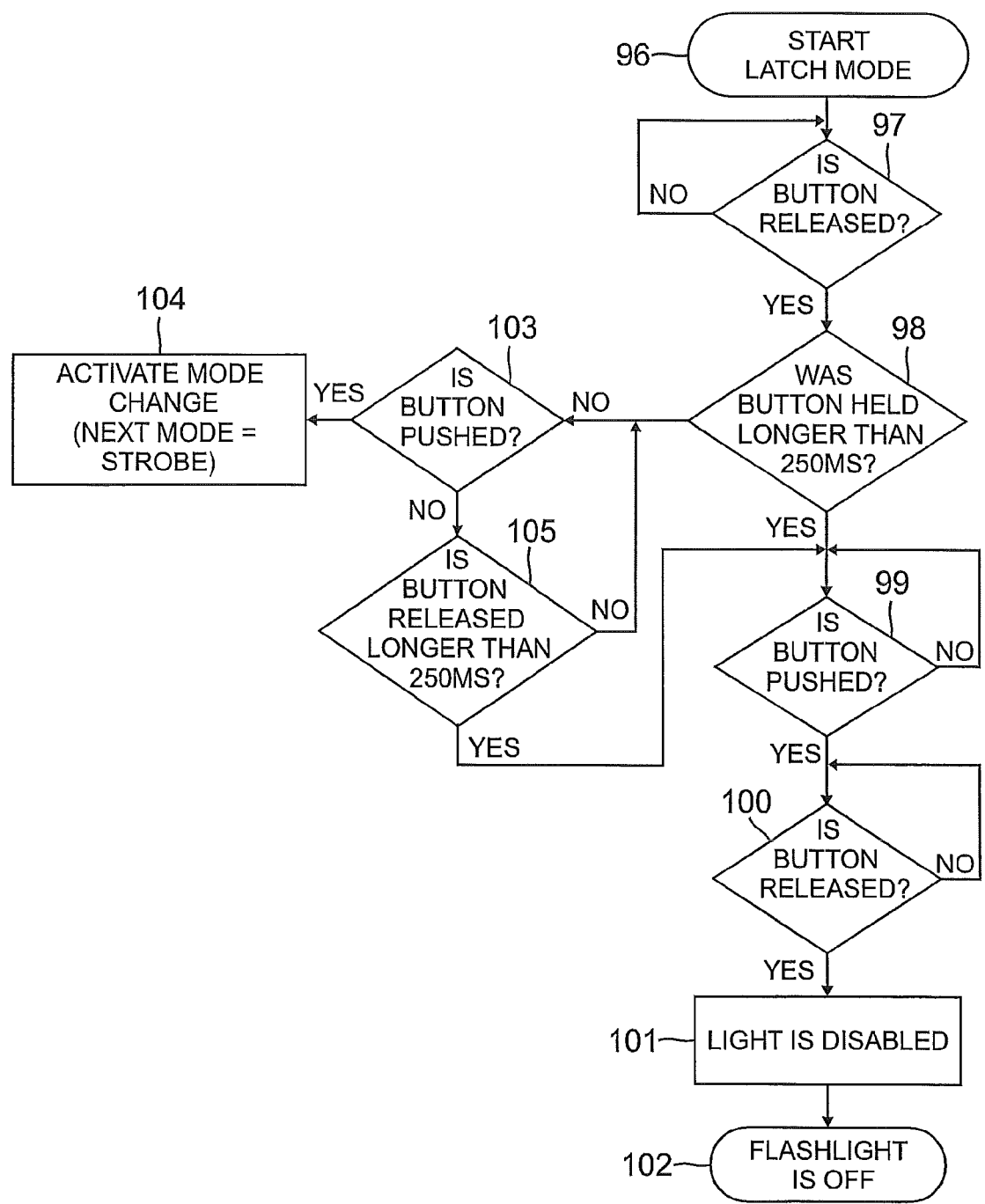
FIG. 9a is a user interface flow chart demonstrating the exemplary embodiment of FIG. 7 starting at a latch mode of the flashlight.

FIG. 9*a* demonstrates the user action starting from the latch mode at 96. If the pushbutton is still pressed, no change will happen. If it is determined though at 97 that the pushbutton has been released, it is determined at 98 whether the pushbutton has been held for more than 250 ms. If so, this means that the latch mode is still established. If it is determined at 99 that the pushbutton is not pushed, the latch mode is maintained, i.e. the flashlight is kept on permanently. For example, this would relate to turning the flashlight permanently on and then just holding it at the barrel or placing it somewhere, for instance on the table. However, if the pushbutton is pushed, it is determined at 100 whether it has meanwhile been released. If the pushbutton is pushed, still no change happens, i.e. the flashlight is kept on in its permanent state. Only when the pushbutton is finally released at 101, the light is disabled and the flashlight is finally turned off at 102.

Going back to 98, if it is determined that the pushbutton was held longer than 250 ms before it had been released, it is determined at 103 whether the pushbutton is pushed again, and if such repeated pushing happened within 250 ms, another mode change is activated, namely a mode change into the strobe mode at 104. However, if it is determined in 105 the pushbutton was released for longer than 250 ms prior to pushing it again the control routine goes back to 99, meaning that no mode change into a different mode is activated. Summarizing the control, mode changes only happen if the pushbutton is pressed repeatedly within a short time period of less than 250 ms. If it is determined that the pushbutton was released for more than 250 ms, the control system decides that the mode that had been established prior to pushing the pushbutton again after a release time that exceeds 250 ms was intended to be selected. By subsequently pushing the pushbutton again after a longer release period the system perceives this button push as the user's intent to shut down the flashlight.

Figure 9B:
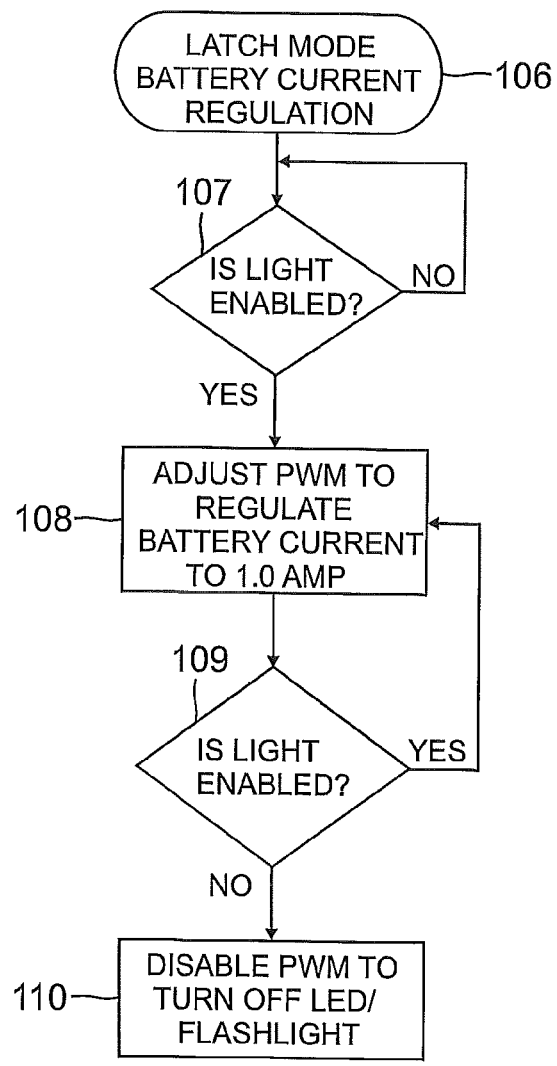
FIG. 9b is a control circuit flow chart demonstrating the exemplary embodiment of FIG. 7 starting at a latch mode of the flashlight.

As far as the current regulation for the latch mode as shown in FIG. 9b is concerned, it looks very similar to the current regulation for the momentary mode as shown in FIG. 8b. At 106, the current regulation for the latch mode is started. When the light is enabled as determined at 107, the pulse width modulation is regulated at 108 to set the current to 1 Amp. Again, modulating the pulse width means adjusting the duty cycle as this has been explained in detail in connection with FIGS. 1 and 2. If it is determined at 109 that the light is still enabled, which does of course depend on the actions by the user, the control loop keeps controlling the battery current to remain at 1 Amp. If in contrast it is determined at 109 that the light is disabled or in other words not enabled, the pulse width modulation is disabled and the LED and respectively the entire flashlight is turned off at 110, again meaning as described in connection with FIG. 2 to disable the voltage regulator 34 via disabling the enabling pin 37.

FIG. 10a demonstrates the user action when starting from the strobe mode at 111. Since this embodiment only comprises three different operational modes and the strobe mode is the last in the sequence, a user action does not result in establishing another operational mode so that the control routine depending on the user action is relatively short. If it is determined at 112 that the pushbutton is released and at 113 that it has not been pushed again, the strobe mode is maintained. Even if the pushbutton has been pushed again at 113 and is kept pushed, the strobe mode is maintained. Only if it is determined at 114 that the pushbutton has again been released, this signals to the flashlight that the user intends to turn it off so that the light is disabled at 115 and the flashlight is finally turned off at 116.

As far as the control of the current in the electric circuit is concerned, the control routine is more complex than for the momentary and the latch mode as shown in FIGS. 8b and 9b, respectively. Starting the strobe mode battery current regulation at 117, if it is determined at 118 that the light is enabled, a timer is set to zero at 119. At 120 the pulse width modulation regulates the battery current to 1 Amp and keeps it at that current for 53 ms until it is determined at 121 that 53 ms are exceeded so that the battery current is regulated at 122 to 0.01 Amp. The reason why a minor current is still maintained correlates to the unique design of the control circuit as described in connection with FIG. 2 above. The control circuit always needs to be provided with a little power, even though it might be just marginal as needed for keeping the microcontroller 29 working. Even though this has the side effect that the LED is not turned off entirely, the light emitted by the LED in this stage is so little that it is not perceived by the viewer, in particular after the user has perceived the much brighter light resulting from the 100 times higher current of 1 Amp when the strobe light is in its full power phase.

If it is determined at 123 that the timer has reached 67 ms from the time it was set to zero at 119, the control routine moves on to determine at 124 whether the light is still enabled, in other words whether the user has not meanwhile turned off the light, and if still enabled, jumps back in the control routine to 119 where the timer is set to zero and repeats this control routine for turning the light periodically on at full power and subsequently turning it close to off to complete one blinking cycle. When it is finally determined that the light is disabled, i.e. the user has pushed the pushbutton again to turn the flashlight off, the pulse width modulation is disabled at 125 and the LED and the entire flashlight are finally turned off at 125.

What is claimed is:

1. A method for controlling light emitted from a light-emitting diode ("LED") used in a portable lighting device, comprising:
   electrically connecting in series in the subsequent order a) a DC power source, b) an inductor, c) the LED, and d) a high frequency switch and
   controlling a current through the LED by calculating a battery current between the DC power source and the high frequency switch;
   wherein the current through the LED is controlled without measuring the current through the LED.

2. The method according to claim 1, wherein the battery current is measured at a node located in a tail circuit that is separated from a head circuit by a barrel circuit.

3. A method for controlling light emitted from a light-emitting diode ("LED") used in a flashlight having a head circuit located in a head of the flashlight, a tail circuit located in a tail of the flashlight and a barrel located in a barrel of the flashlight, wherein the barrel is physically located between the head and the tail, comprising:
   electrically connecting in series in the subsequent order a) a DC power source located in the barrel, b) an inductor located in the head, c) the LED located in the head, and d) a high frequency switch located in the tail; and
   controlling a current through the LED by calculating a battery current between the DC power source and the high frequency switch.

4. The method according to claim 3, wherein the current through the LED is controlled without measuring the current through the LED in the head.

5. The method according to claim 4, wherein the battery current is measured at a node located in the tail.

6. The method according to claim 5, wherein the high frequency switch is controlled by a control circuit located in the tail of the flashlight.

\* \* \* \* \*